United States Patent [19]

Ihara et al.

[11] Patent Number: 5,028,280
[45] Date of Patent: * Jul. 2, 1991

[54] SOFT MAGNETIC ALLOY FILMS HAVING A MODULATED NITROGEN CONTENT

[75] Inventors: Keita Ihara, Katano; Hiroshi Sakakima, Hirakata; Koichi Osano, Sakai, all of Japan

[73] Assignee: Matsushita Electric Industrial Co., Ltd., Osaka, Japan

[*] Notice: The portion of the term of this patent subsequent to Feb. 27, 2007 has been disclaimed.

[21] Appl. No.: 448,619

[22] Filed: Dec. 11, 1989

[30] Foreign Application Priority Data

Dec. 15, 1988 [JP] Japan ................................ 63-317475
Dec. 16, 1988 [JP] Japan ................................ 63-319089
Oct. 6, 1989 [JP] Japan ................................ 1-262405
Oct. 6, 1989 [JP] Japan ................................ 1-262406

[51] Int. Cl.$^5$ ............................................ H01F 1/147
[52] U.S. Cl. .................................... 148/306; 148/307; 148/310; 148/311; 420/117; 420/128
[58] Field of Search ............... 148/306, 307, 310, 311; 420/117, 118, 125, 126, 127, 128; 428/610, 611

[56] References Cited

U.S. PATENT DOCUMENTS

4,836,865 6/1989 Sakakima et al. ................ 148/306
4,904,543 2/1990 Sakakima et al. ................ 428/610

Primary Examiner—Melvyn J. Andrews
Assistant Examiner—George Wyszomierski
Attorney, Agent, or Firm—Stevens, Davis, Miller & Mosher

[57] ABSTRACT

A nitrogen-containing Fe-based soft magnetic alloy suitable for use as the material of a magnetic head core, as well as a method for manufacturing the soft magnetic alloy film. Unlike a mere nitride alloy film, the soft magnetic alloy of the present invention has a compositionally modulated structure in which at least the nitrogen content is periodically modulated in the direction of thickness of the film so as to have a nitride layer rich at least in nitrogen and a non-nitride layer poor at least in nitrogen. The soft magnetic alloy film of the invention comprises a main constituent of Fe, at least one metalloid element selected from the group consisting of B, Si and C, and at least one metal element selected from the group consisting of Nb, Ta, Zr and Ti and has fine Fe-based grains included therein. By virtue of these film structure and film composition, the soft magnetic alloy film of the invention exhibits superior magnetic characteristics such as low coercive force, high saturation magnetization and low magnetostriction, as well as superior resistance both to corrosion and wear.

5 Claims, 7 Drawing Sheets

SOFT MAGNETIC ALLOY FILMS HAVING A MODULATED NITROGEN CONTENT

BACKGROUND OF THE INVENTION

1. Field of the Invention

The present invention relates to a nitrogen-containing Fe based soft magnetic alloy film suitable for use as the material of, for example, a core of a magnetic head.

2. Description of the Prior Art

Soft magnetic alloys used as the material of core of a magnetic head are required to have higher level of saturation magnetization to cope with recent demand for higher density of magnetic recording. On the other hand, in order to manufacture a practical magnetic head with a high reliability, it is important that a strong bonding with a bonding glass be made at the magnetic gap portion etc. of the magnetic head. In general, however, bonding glasses having high bonding strength exhibit a higher melting point. Soft magnetic alloy films, even if they exhibit high levels of saturation magnetization, are therefore required to exhibit good soft magnetic characteristics even after a heat treatment at a high temperature. Due to this restriction from the requirement concerning the thermal stability, conventional soft magnetic alloy films for magnetic heads used in VCR's, etc. have a practical upper limit of saturation magnetization on the order of 10 kGauss or so. In general, production of a soft magnetic alloy having superior soft magnetic characteristic essentially requires that the magnetic anisotropy and saturation magnetostriction constant λs be made as small as possible. Co-based amorphous alloy exhibits superior soft magnetic characteristics partly because of its magnetostriction constant λs being zero and partly because of its small magnetic anisotropy due to its amorphous state. Unfortunately, however, Co-based amorphous alloys generally exhibit lower saturation magnetization than Fe-base amorphous alloy represented by Fe-Si-B alloys. The use of the Co-based amorphous alloys also poses a problem from an economical point of view, because Co is considerably more expensive as compared with Fe. For these reasons, there has been a demand for ferrous soft magnetic alloys. The present inventors have discovered two types of Fe based magnetic alloys: namely, an Fe-Nb-B type alloy having magnetostriction constant λs of $+1 \times 10^{-5}$ and an Fe-Nb-Cu-B alloy having magnetostriction constant λs of $+3 \times 10^{-6}$, and proposed them in the specification of Japanese Patent Application No. 55-164978. These alloys exhibit improved wear resistance and corrosion resistance by virtue of addition of Nb but are rather inferior in thermal stability, wear resistance and corrosion resistance as compared with metal-metal amorphous alloys of Co-Nb-Zr type (see specifications of Japanese Patent Application Nos. 56-181723 and 56-212873) which are currently used as the material of VCR magnetic heads.

Nitriding is a measure which is available for improving wear resistance and corrosion resistance of the above-mentioned ferrous soft magnetic alloys. Studies such as a study on formation of nitride film through combination between Fe, Co, Ni and B, Si, Al, P, C etc. (see Japanese Patent Unexamined Publication No. 54-94428) and a study on Fe nitrides (see Journal of Applied Phys. Vol. 53 (11), pp 8332–34 (1982)) have been made in regard to nitriding of Fe based soft magnetic alloys. The technique disclosed in Japanese Patent Unexamined Publication No. 54-94428, however, encounters a problem in that the soft magnetic characteristic is seriously affected by an increase in the vertical magnetic anisotropy, and in that the level of the saturation magnetization is lowered. On the other hand, it has been reported that the technique disclosed in the Journal of Applied Phys. is disadvantageous in that the soft magnetic characteristic is impaired due to the fact that the coercive force of the alloy is increased as a result of nitriding of Fe.

As has been described, nitrides of alloys containing Fe as the major constituent possess wear resistance and corrosion resistance equivalent to those of Co-Nb-Zr alloys which are practically used, as well as higher level of saturation magnetization than Co-based alloys. In addition, these nitrides are rather inexpensive and, hence, are advantageous from the view point of economy. Unfortunately, however, these nitrides are not expected to exhibit superior soft magnetic characteristics.

SUMMARY OF THE INVENTION

Accordingly, an object of the present invention is to provide an Fe-based soft magnetic alloy film for use in a magnetic head, which exhibits superior soft magnetic characteristics such as low coercive force after a heat treatment at a high temperature, as well as superior magnetic characteristics such as high level of saturation magnetization and low magnetostriction, while showing improved corrosion resistance and wear resistance, by employing a compositionally modulated structure produced by applying nitrogen to an Fe-based alloy film, rather than by application of a mere nitride alloy.

To this end, according to the present invention, there is provided a soft magnetic alloy film containing at least one metalloid element selected from a group consisting of B, Si and C, at least one metal element selected from the group consisting of Nb, Ta, Zr and Ti, and a main constituent of Fe, the soft magnetic alloy film having a structure in which at least the nitrogen content is modified in the direction of thickness of the film so as to have a nitride layer rich at least in both nitrogen and metalloid element and a non-nitride layer poor at least in these nitrogen and metalloid elements, the structure containing fine crystal grains of Fe based alloy.

The soft magnetic alloy of the present invention can be manufactured by a process comprising the steps of: forming an alloy film through a sputtering by using, as the target, an Fe-based alloy containing at least one metalloid element selected from a group consisting of B, Si and C, at least one metal element selected from the group consisting of Nb, Ta, Zr and Ti, and a main constituent of Fe, while periodically introducing and mixing nitrogen gas in the inert sputtering gas such as argon, so that a compositionally modulated nitride alloy film is obtained in which at least the nitrogen content is modified in the direction of thickness of the film; and subjecting said compositionally modulated nitride alloy film to a high-temperature heat treatment, whereby a soft magnetic alloy film is formed which has a film structure having a nitride layer rich at least in both nitrogen and metalloid element and a non-nitride layer poor at least in the nitrogen and metalloid element, and which film contains fine crystal grains of Fe based alloy.

The invention provides a soft magnetic alloy film which specifically exhibit superior soft magnetic characteristics and high level of saturation magnetization, in which at least the nitrogen composition is modulated in the direction of thickness of the film and which has a mean film composition expressed by:

$$M_a T_b X_c N_d \quad \ldots \quad (1)$$

wherein M represents an Fe-based metal selected from a group consisting of Fe, Fe-Co, Fe-Ni and Fe-Co-Ni, T represents at least one metal element selected from a group consisting of Nb, Ta, Zr and Ti, X represents at least one metalloid element selected from a group consisting of B, Si and C, and N represents nitrogen, and wherein the contents a, b, c and d of M, T, X and N in terms of atomic % are selected to satisfy the following conditions.

$$60 \leq a \leq 90, \ 1 \leq b \leq 15, \ 2 \leq c \leq 25, \ 1 \leq d \leq 25 \text{ and}$$
$$a+b+c+d=100 \quad \ldots \quad (1')$$

This soft magnetic alloy film exhibits specifically excellent soft magnetic characteristic when it has a compositionally modulated wavelength of not more than 50 nm in the direction of thickness of said film.

This soft magnetic alloy film is produced by a method of manufacturing a soft magnetic alloy film comprising the steps of: forming an alloy film through sputtering by using, as the target, an alloy having a composition expressed by:

$$M_{a'} T_{b'} X_{c'} \quad \ldots \quad (2)$$

where M represents an Fe-based metal selected from a group consisting of Fe, Fe-Co, Fe-Ni and Fe Co-Ni, T represents at least one metal element selected from a group consisting of Nb, Ta, Zr and Ti and X represents at least one metalloid element selected from a group consisting of B, Si and C, and where the contents a', b' and c' of M, T and X in terms of atomic % are selected to satisfy the following conditions:

$$70 \leq a' \leq 95, \ 1 \leq b' \leq 15, \ 3 \leq c' \leq 25 \text{ and}$$
$$a'+b'+c'+=100 \quad \ldots \quad (2')$$

while periodically introducing and mixing nitrogen gas in the inert sputtering gas such as argon at a rate expressed by:

$$2\% \leq Pn \leq 20\% \quad \ldots \quad (2'')$$

where Pn represents the ratio of the nitrogen gas pressure to the total sputtering gas pressure during the sputtering expressed in terms of percentage, so that a compositionally modulated nitride alloy film is obtained in which at least the nitrogen content is modulated in the direction of thickness of the film and in which the compositionally modulated wavelength is not more than 40 nm; and subjecting said compositionally modulated nitride alloy film to a high-temperature heat treatment.

The invention provides a soft magnetic alloy film which exhibits, in addition to superior soft magnetic characteristics and high level of saturation magnetization, low magnetostriction in which at least the nitrogen composition is modulated in the direction of thickness of the film and which has a mean film composition expressed by:

$$M_{a''} T_{b''} X_{c''} N_{d''} \quad \ldots \quad (3)$$

wherein M represents an Fe-based metal selected from a group consisting of Fe, Fe-Co, Fe-Ni and Fe-Co-Ni, T represents at least one metal element selected from a group consisting of Nb, Ta, Zr and Ti, X represents at least one metalloid element selected from a group consisting of B, Si and C, and N represents nitrogen, and wherein the contents a'', b'', c'' and d'' of M, T, X and N in terms of atomic % are selected to satisfy the following conditions.

$$65 \leq a'' \leq 90, \ 1 \leq b'' \leq 10, \ 2 \leq c'' \leq 13, \ b \leq d'' \leq 20 \text{ and}$$
$$a''+b''+c''+d''=100 \quad \ldots \quad (3')$$

Specifically excellent soft magnetic characteristics are obtained with the composition expressed by the formula (3) when the compositionally modulated wavelength in the direction of thickness of said film is 40 nm or smaller.

This soft magnetic alloy film which exhibits low magnetostriction in addition to superior soft magnetic characteristics and high level of saturation magnetization, can be manufactured by a process comprising the steps of: forming an alloy film through a sputtering by using, as the target, an alloy having a composition expressed by:

$$M_{a^*} T_{b^*} X_{c^*} \quad \ldots \quad (4)$$

where M represents an Fe-based metal selected from a group consisting of Fe, Fe-Co, Fe-Ni and Fe-Co-Ni, T represents at least one metal element selected from a group consisting of Nb, Ta, Zr and Ti and X represents at least one metalloid element selected from a group consisting of B, Si and C, and where the contents a*, b* and c* of M, T and X in terms of atomic % are selected to satisfy the following conditions:

$$80 \leq a^* \leq 95, \ 1 \leq b^* \leq 12, \ 3 \leq c^* \leq 15 \text{ and}$$
$$a^*+b^*+c^*=100 \quad \ldots \quad (4')$$

while periodically introducing and mixing nitrogen gas in the inert sputtering gas such as argon at a rate expressed by:

$$5\% \leq Pn \leq 15\% \quad \ldots \quad (4'')$$

where Pn represents the ratio of the nitrogen gas pressure to the total sputtering gas pressure during the sputtering expressed in terms of percentage, so that a compositionally modulated nitride alloy film is obtained in which at least the nitrogen content is modulated in the direction of thickness of the film; and subjecting said compositionally modulated nitride alloy film to a high-temperature heat treatment conducted at a temperature not lower than 500° C.

A soft magnetic alloy film having extremely excellent soft magnetic characteristics such as high magnetic permeability is obtained by conducting, in the methods stated above, the high-temperature heat treatment in a magnetic field.

The soft magnetic alloy film of the present invention is an Fe-based alloy containing metallic elements such as Nb, Ta, Zr and Ti and metalloid elements such as B, Si and C. Unlike ordinary pure nitride films, the soft magnetic alloy film of the present invention exhibits, after formation of the film by sputtering, a distinctive compositionally modulated structure in which the N content is modulated in the direction of thickness of the film, i.e., a laminated structure composed of a nitride layer rich in nitrogen and a non-nitride layer poor in nitrogen. The method of the invention for manufacturing a soft magnetic alloy film is a method for forming the soft magnetic alloy film of the present invention. According to the method of the present invention, an Fe-based compositionally modulated nitride alloy film is formed by sputtering, such that at least the N content is modulated in the direction of thickness of the film. Then, a heat treatment is effected on the as-sputtered compositionally modulated nitride alloy film at a high temperature so as to cause a change in the film structure, whereby a soft magnetic alloy film having both superior soft magnetic characteristics and high level of saturation magnetization is obtained.

A description will be given of the method of the present invention for manufacturing a soft magnetic alloy film.

The soft magnetic alloy film is formed by sputtering which is conducted by using, as the target, an Fe-based alloy containing at least one metalloid element selected from a group consisting of B, Si and C and at least one metal element selected from a group consisting of Nb, Ta, Zr and Ti, The sputtering is conducted in an inert spatter gas such as argon (Ar) while periodically introducing nitrogen gas N2 into the spattering gas, thus obtaining a compositionally modulated nitride alloy film in which at least the nitrogen content is modulated in the direction of the thickness of the film. The compositionally modulated nitride alloy film thus formed exhibits a distinctive compositionally modulated structure: namely, a laminated structure having a nitride layer rich in nitrogen and a non-nitride layer poor in nitrogen. When introduction of nitrogen gas is conducted during the sputtering, a reactive spatter is formed so that a nitride layer with nitrogen contained in the alloy film is formed. It is considered that the introduction of nitrogen into the alloy film is promoted when the target used in the sputtering contains an element such as Nb, Ta, Zr, ti or the like which exhibits a higher affinity to the nitrogen than Fe. The thicknesses of the nitride layer and the non-nitride layer are controllable through changing the period of introduction of the nitrogen gas during the sputtering. Thus, the sum of the thickness of the nitride layer and the thickness of the non-nitride layer per each sputtered layer determines the compositionally modulated wavelength. The compositionally modulated structure, in which at least the nitrogen content is modulated in the direction of the film thickness, can be confirmed by obtaining, for example, AES depth profiles of contained elements by use of, for example, Auger Electron Spectroscopy (AES). The nitride layer and the non-nitride layer have different composition ratios. The nitride layer having greater nitrogen content naturally has smaller contents of other elements as compared with the non-nitride layer. Thus, in the as-sputtered compositionally modulated nitride alloy film, the contents of the metalloid elements in the nitride layer are small as compared with the non-nitride layer. Thus, the metalloid elements and metal elements are contained in inverse phase in the direction of thickness of the film. The as-sputtered compositionally modulated nitride alloy film has an amorphous phase, or a crystalline phase with extremely small crystal grain size or their mixture. The as-sputtered compositionally modulated nitride alloy can have a high level of saturation magnetization provided that the composition of the alloy target is suitably selected in the sputtering, but the soft magnetic characteristics are still unsatisfactory. Thus, the as-sputtered compositionally modulated nitride alloy film cannot be used as the material of magnetic heads, unless a suitable heat-treatment is conducted subsequently to the sputtering.

After the heat treatment at a high temperature, the sputtered compositionally modulated nitride alloy film exhibits both superior soft magnetic characteristics and high level of saturation magnetization. The compositionally modulated structure of the compositionally modulated nitride alloy film largely vary as a result of the heat treatment at high temperature, because of both fusion of the constituents and precipitation of fine grains of Fe based alloy during the heat treatment. However, the modulation of the nitrogen content in the direction of thickness of the film remains even after the heat treatment. In contrast, a single-layered pure nitride film which is nitrided uniformly, can hardly exhibit soft magnetic characteristics and does not exhibit any improvement in the magnetic characteristics even through a heat treatment. It is therefore a critical and essential condition that the nitrogen content is compositionally modulated in the direction of thickness of the film, in order to obtain a superior soft magnetic alloy film. The soft magnetic alloy film after the heat treatment at high temperature has a film structure which includes a nitride layer rich in at least both nitrogen and metalloid elements and a non-nitride film poor in at least nitrogen and metalloid elements, and has fine grains of Fe based alloy. An AES profile analysis of the soft magnetic alloy film after the high-temperature heat treatment will show that the contents of the metalloid elements are greater in the nitride layer than in the non-nitride layer and that the Fe content is greater in the non-nitride layer than in the nitride layer. Thus, although the soft magnetic alloy film prepared before the high temperature heat treatment contains the metalloid elements and nitrogen element in an inverse phase relation to each other, the soft magnetic alloy film obtained after the high-temperature heat treatment exhibits the same phase relation with respect to the contents of the metalloid elements and nitrogen element This may be attributed to a special manner of diffusion caused by the fact that the metalloid elements such as B, Si and C exhibit greater tendency of bonding to nitrogen than to Fe. An alloy film cross-sectional image obtained through a transmission electron microscope of the soft magnetic alloy film obtained after the high-temperature heat treatment showed numerous fine crystal grains of grain sizes not more than 20 nm in and around the non-nitride layer. An X-ray diffraction proved that these fine crystal grains are $\alpha$-Fe grains having a body-centered cubic lattice. It is considered that the $\alpha$-Fe grains have been produced as a result of the fact that the non-nitride layer has been extremely enriched in Fe as a result of the specific diffusion caused by the high-temperature heat treatment. It is considered that the grain growth of the fine Fe-base crystal grains is suppressed during the heat treatment, due to presence of nitride layer, so that the soft magnetic alloy film obtained after the heat treatment exhibits superior thermal stability of the soft magnetic characteristics. Thus, the high-temperature heat treatment causes a change in the structure of the alloy film so that the soft magnetic alloy film obtained after the high-temperature heat treatment exhibits superior soft magnetic characteristics with reduced coercive force and increased level of saturation magnetization. It is therefore considered that both the special manner of diffusion of elements caused by the high-temperature heat treatment and the resultant generation of fine crystal grains of Fe contribute to the realization of the soft magnetic characteristics. The method of the invention for manufacturing the soft magnetic alloy film s suitable for use in the production of magnetic head cores because it provides superior soft magnetic characteristics after the high-temperature heat treatment.

A description will be given of the soft magnetic alloy in accordance with the present invention. The soft magnetic alloy film of the present invention is a kind of nitride alloy containing nitrogen and, therefore, exhibits superior corrosion-resistance and wear-resistance characteristics. The soft magnetic alloy film of the present invention, however, is not a mere nitride film but is a film having a distinctive compositionally modulated structure in which at least the nitrogen content is modulated in the direction of thickness of the film. Thus, elements having small affinity to nitrogen, e.g., Fe, and elements having high levels of affinity to nitrogen, e.g.,metalloid elements such as B, Si, C and etc. and metal elements such as Nb, Ta, Zr, Ti and etc., exist in the alloy film. It is considered that, in the soft magnetic alloy film of the invention obtained after the high-temperature heat treatment, elements such as B, Si, C, Nb, Ta, Zr, Ti, etc. are selectively bonded chemically to nitrogen with high levels of bonding strength The presence of these elements is important for obtaining superior soft magnetic characteristics through the high-temperature heat treatment. The metallic elements such as Nb, Ta, Zr, Ti and so forth are necessary for the purposes of facilitating introduction of nitrogen into the alloy film during the reactive sputtering, realizing thermally stable soft magnetic characteristics after the high-temperature heat treatment and improving both corrosion- and wear-resistance characteristics. The metalloid elements such as B, Si, C and so forth are necessary for enabling the special manner of diffusion through high-temperature heat treatment to thereby facilitate realization of superior soft magnetic characteristics. Therefore, the soft magnetic alloy of the present invention is an Fe-based alloy film containing Fe as a main constituent, at least one metalloid elements selected from a group consisting of B, Si and C, and at least one metal element selected from the group consisting of Nb, Ta, Zr and Ti.

The alloy film having the composition expressed by the composition formula (1) enables production of a soft magnetic alloy having particularly superior magnetic characteristic and high saturation magnetization. In order to obtain a soft magnetic alloy film having high levels of saturation magnetization, the content a of M, content b of T, content c of X and the content d of N in the mean composition of the film, expressed in terms of atomic %, are to be determined to meet the conditions of $a \geq 60$, $b \leq 15$, $c \leq 25$ and $d \leq 25$. Conversely, for obtaining superior soft magnetic characteristics, it is necessary that that the conditions of $a \leq 90$, $b \geq 1$, $2 \leq c \leq 25$ and $1 \leq d \leq 25$ are met. In order to obtain a soft magnetic alloy film superior both in resistances to corrosion and wear and the soft magnetic characteristics, it is necessary that the conditions of $b \geq 1$, $c \leq 25$ and $d \geq 1$ are met. In order to attain an appreciable effect in improving the corrosion resistance, it is necessary that the content d of nitrogen is not smaller than 1 atomic %. Conversely, the nitrogen content d exceeding 25 atomic % is not adoptable because such a high nitrogen content causes exfoliation of the alloy film. The above-mentioned ranges of contents are expressed by formula (1'). It is possible to obtain a soft magnetic alloy film having specifically excellent soft magnetic characteristic provided that the compositionally modulated wavelength is determined to be not more than 50 nm. Oxygen may be incidentally included in the soft magnetic alloy film but this does not cause any problem if the content of oxygen is sufficiently small.

In order to obtain the soft magnetic alloy film of the composition (1) by sputtering, an alloy target of the composition formula (2) is essentially required considering that nitrogen is contained in the alloy film during the sputtering. According to the method of the invention for producing a soft magnetic alloy film, the soft magnetic alloy film expressed by the composition formula (1) is obtained by forming a compositionally modulated nitride alloy film, using the alloy target of the composition formula (2) and then effecting a high-temperature heat treatment on the thus formed alloy film. In order that this soft magnetic alloy film can have high level of saturation magnetization, the content a' of M, content b' of T, and the content c' of X in the formula (2) expressed in terms of atomic %, are to meet the conditions of $a' \geq 70$, $b' \leq 15$, $c' \leq 25$. For obtaining superior soft magnetic characteristics, it is necessary that that the conditions of $a' \leq 95$, $b' \geq 1$ and $3 \leq c' \leq 25$ are met. Thus, in order that both requirements are met, the composition has to meet the conditions of $70 \leq a' \leq 85$, $1 \leq b' \leq 15'$, $3 \leq c' \leq 25$ and $a' + b' + c' = 100$. These conditions are synthetically shown in the formula (2'). The rate of the periodical introduction of the nitrogen gas into the inert sputtering gas such as argon during the formation of the alloy film is expressed by the partial pressure ratio Pn in terms of percentage to the total sputtering gas pressure. In order to obtain the soft magnetic alloy of the formula (1), it is necessary that the conditions of $2(\%) \leq Pn \leq 20(\%)$ be met as expressed by the formula (2''). The method of the invention employs, for the purpose of manufacturing the soft magnetic alloy film expressed by the composition (1), the steps of forming a compositionally modulated nitride alloy film in which at least the nitrogen composition is modulated in the direction of thickness of the film, through a sputtering process which is conducted by employing the above-specified target and the above-specified nitrogen partial pressure, and then conducting a high-temperature heat treatment on the thus formed film at a temperature which is not lower than 300° C.

The composition formula (3) shows the mean composition of an alloy film of the present invention which exhibits a low magnetostriction in addition to the excellent soft magnetic characteristics and the high level of saturation magnetization. The term "low magnetostriction" is used to mean that the magnetostriction constant is zero or near zero. The composition shown in the formula (3) contains M, T, X and N as in the case of the composition of the formula (1) but the composition ranges of these elements are restricted from the composition ratios shown in the formula (1'). Namely, in order to simultaneously meet both the demands for the low magnetostriction and high saturation magnetization, the contents a'', b'', c'' and d'' of M, T, X and N, respectively, in terms of atomic % should be determined to meet the condition of $a'' \geq 65$, $b'' \leq 10$, $2 \leq c'' \leq 13$ and $5 \leq d'' \leq 20$. These composition ranges and the composition ranges shown by the formula (1') are synthetically shown in the formula (3''). It is possible to obtain a soft magnetic alloy having specifically high magnetic permeability and low coercive force, provided that the compositionally modulated wavelength of the compositionally modulated nitride alloy film is determined to be not greater than 40 nm. Inclusion of oxygen in this soft magnetic alloy is inevitable also in this case, but this does not cause any substantial problem if the oxygen content is sufficiently small.

In order to obtain through a sputtering a soft magnetic alloy of the formula (3) which has both low magnetostriction and high saturation magnetization, it is necessary to employ an alloy target of the composition shown by the formula (4) and the nitrogen gas partial pressure Pn as specified by the formula (4"). The contents a*, b* and c* of the elements M, T and X in the formula (4), in terms of atomic %, should be determined to meet the conditions of $80 \leq a^* \leq 95$, $1 \leq b^* \leq 12$ and $3 \leq c^* \leq 15$ and $a^* + b^* + c^* = 100$. These composition ranges are synthetically shown by the formula (4'). The rate of the periodical introduction of the nitrogen gas into the inert sputtering gas such as argon during the formation of the alloy film is expressed by the partial pressure ratio Pn in terms of percentage to the total sputtering gas pressure. In order to obtain the soft magnetic alloy of the formula (3), it is necessary that the conditions of $5(\%) \leq Pn \leq 15(\%)$ be met as expressed by the formula (4"). The method of the invention employs, for the purpose of manufacturing the soft magnetic alloy film expressed b the composition (3), the steps of forming a compositionally modulated nitride alloy film in which at least the nitrogen composition is modulated in the direction of thickness of the film, through a sputtering which is conducted by employing the above-specified target and the above-specified nitrogen partial pressure, and then conducting a high-temperature heat treatment on the thus formed film at a temperature which is not lower than 500° C.

According to the method of the present invention, it is possible to obtain a soft magnetic alloy film having an extremely superior magnetic alloy characteristics such as high magnetic permeability, when the as-sputtered compositionally modulated nitride alloy film is heat-treated at a high temperature within a magnetic field. The effect produced by a heat-treatment in a magnetic field has been commonly recognized as induction magnetic anisotropy as experienced with the cases of amorphous alloys and permalloys. The present inventors have confirmed that the heat treatment in a magnetic field is effective also in crystalline alloy films having the compositionally modulated structure as described and containing Fe as a main constituent. More specifically, it is possible to improve the magnetic permeability of the soft magnetic alloy applying a magnetic field of 1 (Oe) or stronger during the high-temperature treatment. The as-sputtered compositionally modulated nitride alloy film or the soft magnetic alloy obtained after the high-temperature heat treatment may incidentally contain oxygen. This, however, does not cause any problem provided that the oxygen content is sufficiently small.

The soft magnetic alloy of the present invention exhibits improved wear resistance and corrosion resistance by virtue of the nitriding. In addition, excellent soft magnetic characteristics and superior thermal stability are ensured by the compositionally modulated structure. In addition, the soft magnetic alloy of the invention contains Fe as a main constituent which provides a high level of saturation magnetization and which enables an economical production.

DESCRIPTION OF THE PREFERRED EMBODIMENTS

FIrst Embodiment

As a first embodiment, soft magnetic alloy film of the present invention was produced by the method of the invention for producing a soft magnetic alloy film, using an alloy target having a composition expressed by $Fe_{79.5}Nb_6Si_3B_{11.5}$. This first embodiment will be described in detail hereinunder.

A sputtering was conducted on a ceramic substrate using the above-mentioned alloy target while periodically mixing nitrogen gas $N_2$ in the argon gas which was used as the inert sputtering gas, whereby a compositionally modulated nitride alloy film was formed on the ceramic substrate such that nitride layers of 10 nm thick per layer and non-nitride layers of 10 nm thick per layer were alternately formed. The ratio of the nitrogen gas introduced during the sputtering is expressed in terms of the partial pressure Pn (%) of nitrogen. In this case, the nitrogen gas partial pressure was Pn = 10(%). The sum of the thickness of one non-nitride layer is defined as the compositionally modulated wavelength. In this case, the compositionally modulated wavelength was 20 nm. The as-sputtered composition-modified nitride alloy film exhibited magnetic characteristics such as a saturation magnetization level of 9.6 kGauss and a coercive force of 11 Oe which are quite far from satisfying requirements for materials of a magnetic head core. For the purpose of comparison, sputtering was conducted by using the same target as the embodiment, in which argon gas alone was used as the sputtering inert gas so that a single non-nitride layer was formed. Similarly, a film was formed by using the same target, in a mixture sputtering inert gas of a fixed ratio of nitrogen and argon gases so that a single nitride layer was formed. In the following description of the preferred embodiment, the term CMNF is used to mean the compositionally modulated nitride alloy film.

Figure 1:
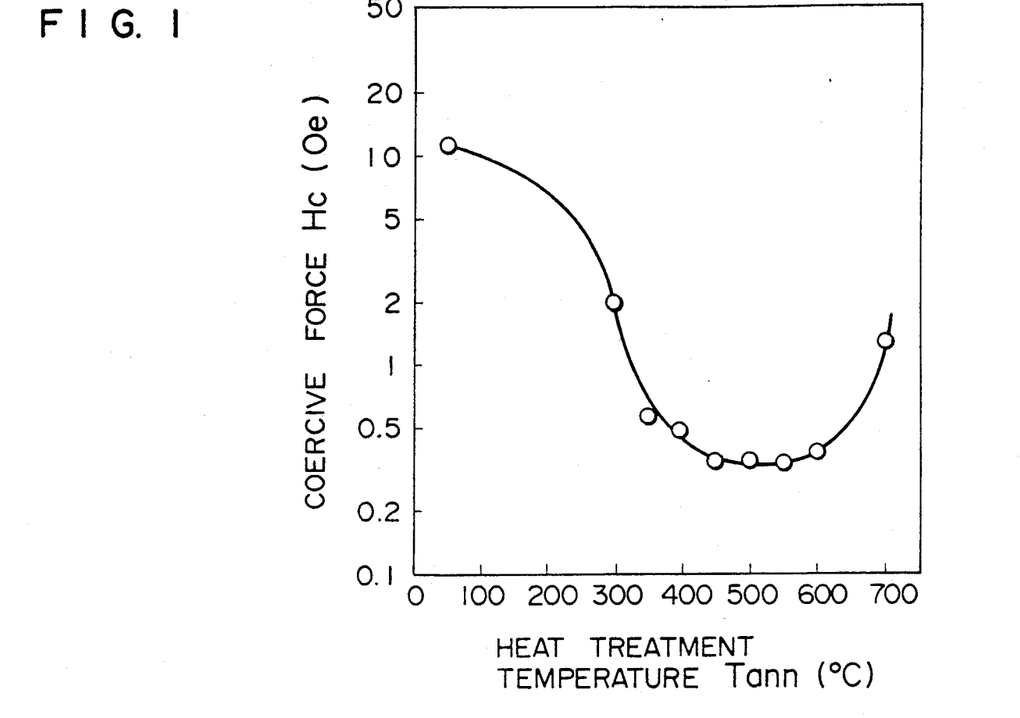
FIGS. 1, 2, 5, 7, 8 and 9 are illustrations of the magnetic characteristics of soft magnetic alloy films of the present invention.
Figure 2:
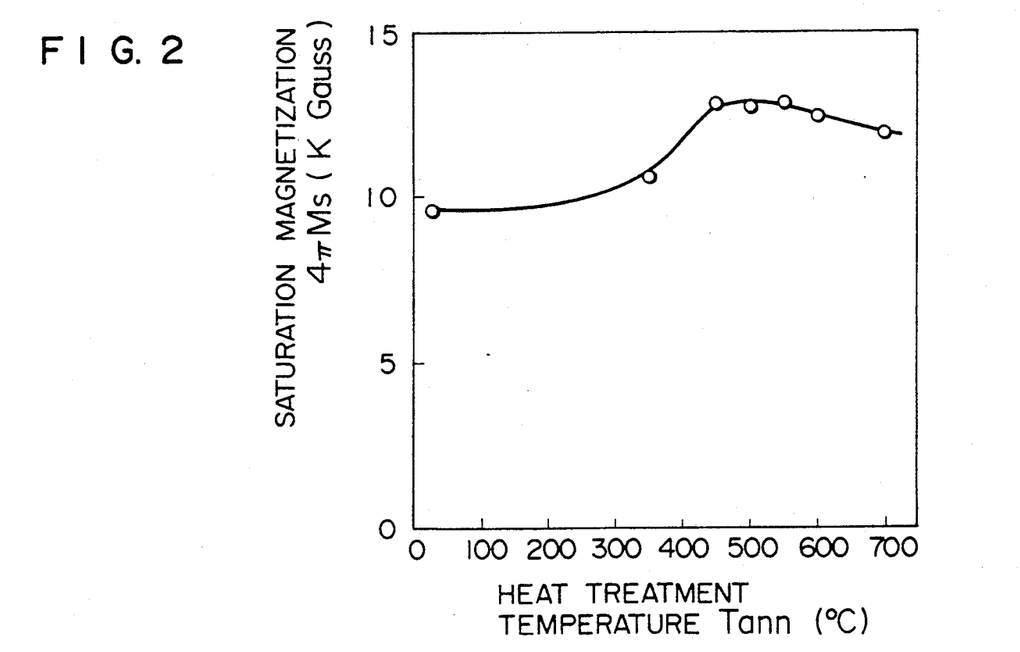

The alloy films having the above-described various structures were heat-treated in a rotating magnetic field. The single nitride layer which was uniformly nitride did not show any soft magnetic characteristic and failed to show any improvement in the magnetic characteristics even after the heat treatment. On the other hand, the single non-nitride layer exhibited coercive force which was reduced after a heat treatment at about 400° to about 450° C. but the coercive force was increased due to recrystallization when the heat-treating temperature was raised to 500° C. or above. In contrast, the compositionally modulated nitride alloy film prepared in accordance with the method of the present invention showed low levels of coercive fore after heat treatment conducted at temperatures between 350° and 600° C., as will be realized from FIG. 1 which shows the relationship between the heat-treating temperature Tann (°C.) and the coercive force Hc(Oe) of the compositionally modulated nitride alloy after 1-hour heat treatment at each temperature. FIG. 2 shows the relationship between the heat-treating temperature Tann (°C.) and saturation magnetization (4 πMs) of the compositionally modulated nitride film at room temperature. From this Figure, it will be seen that the level of the saturation magnetization increases when the heat treating temperature is 300° C. or above. It is therefore understood that the heat treatment is conducted at a temperature of 300° C. or higher in order to simultaneously obtain both excellent soft magnetic characteristics and high level of saturation magnetization. The dependency of the magnetic characteristics of the compositionally modulated nitride alloy film on the heat-treating temperature is closely related to the change in the structure of the alloy film. The difference between the film structure of the compositionally modulated nitride alloy film before the heat treatment and that after the heat treatment will be discussed hereinunder.

Figure 3A:
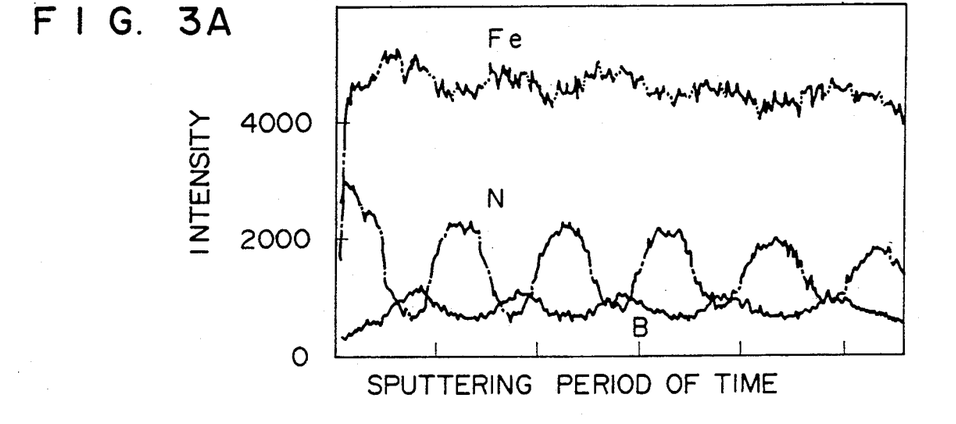
FIGS. 3, 4 and 6 are illustrations of the film structures of soft magnetic alloys in accordance with the present invention.
Figure 3B:
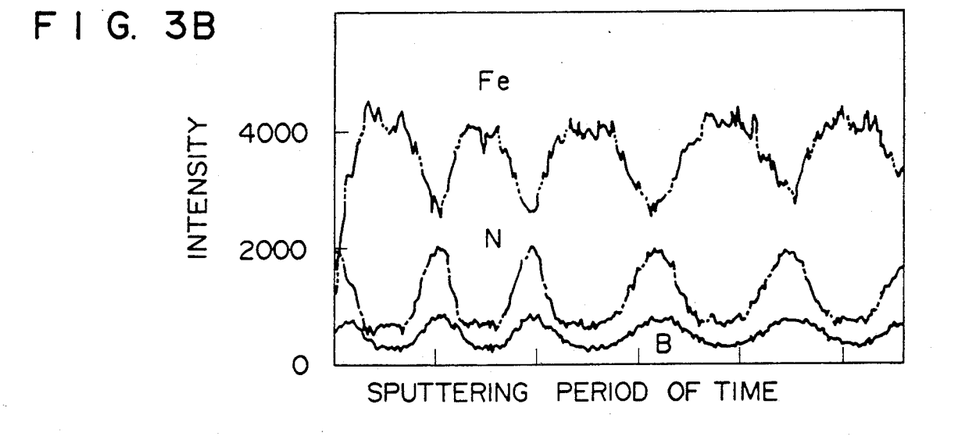
Figure 3C:
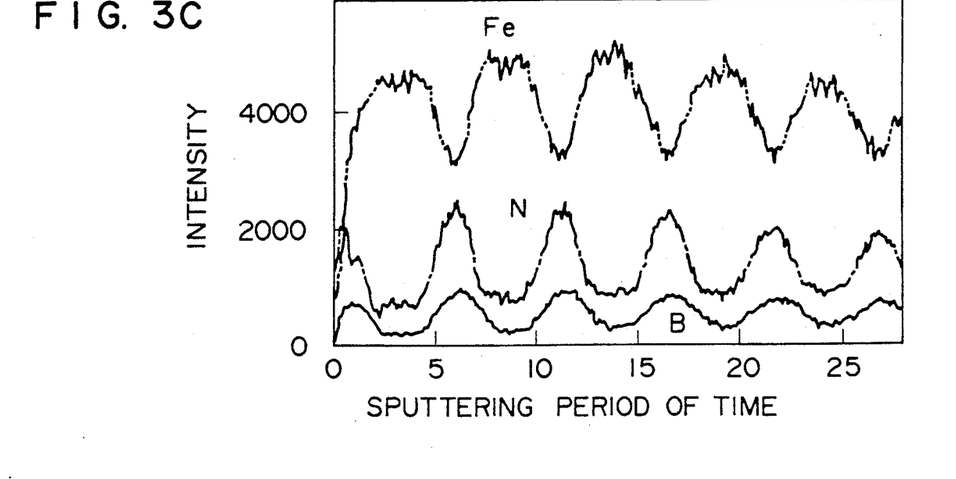
Figure 4A:
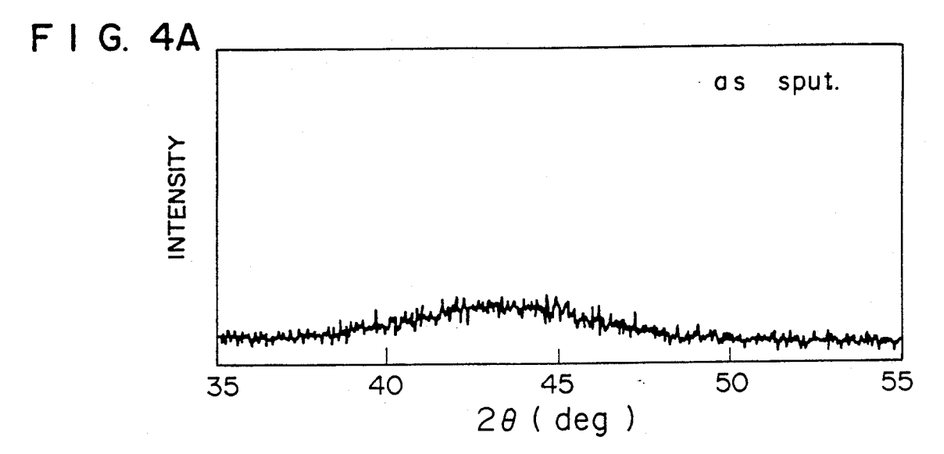
Figure 4B:
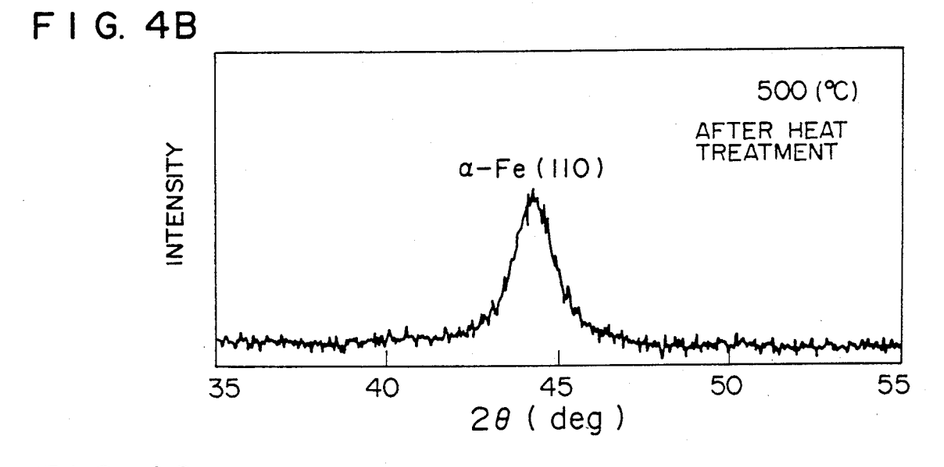
Figure 4C:
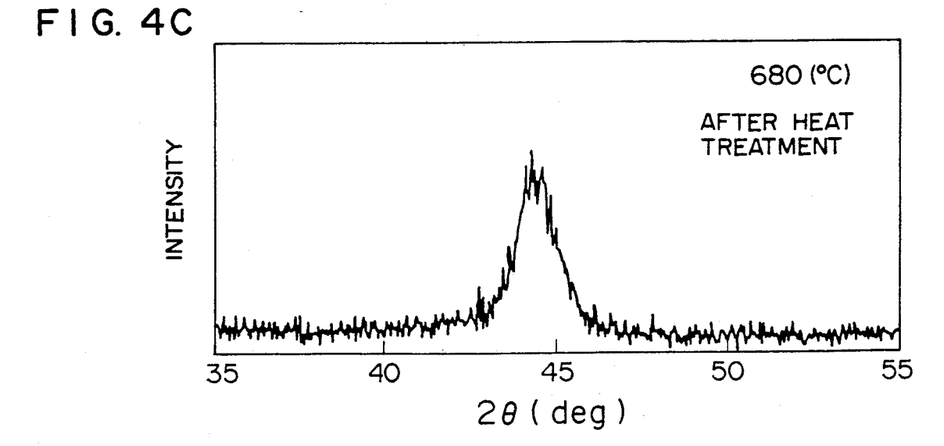
Figure 5:
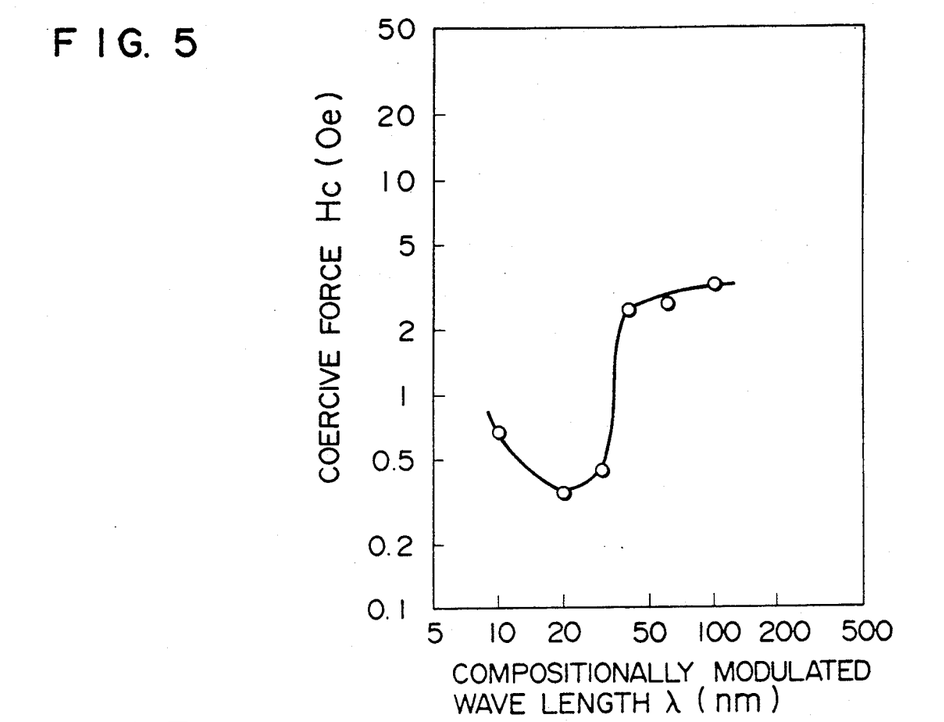

FIGS. 3(a) to 3(c) show an AES (Auger Electron Spectroscopy) profile concerning the contents of Fe, N and B in the direction of the film thickness as measured by an Auger Electron Spectroscopy. More specifically, FIG. 3(a) shows the AES depth profile as observed with the as-sputtered compositionally modulated nitride alloy film before the high-temperature heat treatment. FIG. 3(b) shows the AES depth profile as observed after 1-hour high-temperature heat treatment at 500° C., while FIG. 3(c) shows that after 1-hour high-temperature heat treatment at 680° C. It will be seen from FIG. 3(a) that the as-sputtered structure has a nitride layer rich in N and a non-nitride layer poor in N and rich in Fe and B. Thus, Fe and B are contained in the same phase relation to each other and in opposite phase relation to N in the direction of thickness of the film. In contrast, in the structures after the heat treatment, as shown in FIGS. 3(b) and 3(c), the B content is greater in the nitride layer than in the non-nitride layer, while the Fe content is greater in the non-nitride layer than in the nitride layer. That is, N and B appear in the same phase relation in the direction of the film thickness, and N and B are in an opposite phase relation to Fe. Thus, the heat temperature at high temperature causes a change from a state in which N and B appear in opposite phase relation to each other into another state in which N and B appear in the same phase relation to each other in the direction of the film thickness. This is attributable to a special manner of diffusion caused by the fact that the metalloid elements such as B exhibit greater tendency of bonding to nitrogen than to Fe. Si which also is a metalloid element appears in the same phase relation as N and B before and after the high-temperature heat treatment. The same applies also to Nb which is a metal element. In a case of Nb, however, the degree of compositional modulation is comparatively small. FIGS. 4(a) to 4(c) show X-ray diffraction patterns as obtained with the alloy film in the states before and after high-temperature heat treatment. More specifically, FIG. 4(a) shows the X-ray diffraction pattern as observed with the as-sputtered compositionally modulated nitride alloy film in the state before the high-temperature heat treatment. It is considered that the structure of the alloy film in this state has an amorphous state or a very fine crystalline state with extremely fine grains or a mixture thereof. FIGS. 4(b) and 4(c) show the X-ray diffraction patterns as observed after 1-hour heat treatment at 500° C. and 680° C., respectively. In each of the cases shown in FIGS. 4(b) and 4(c), the structure is crystalline and α-Fe with body centered cubic lattice is observed. Judging from the peak levels and the half-value widths, however, both crystalline structures are predicted to be very fine structures. An electron-microscopic observation of cross-section of an actual soft magnetic alloy after the high-temperature heat treatment showed numerous fine crystal grains of grain size of 20 nm or smaller in and around the non-nitride layer. These fine grains are Fe crystal grains. It is considered that the generation of fine Fe crystal grains is promoted by the enrichment of Fe in the non-nitride layer as a result of the special manner of diffusion caused by the heat-treatment and that the growth of these grains is suppressed during the heat-treatment due to presence of the nitride layer. The Fe based fine crystal grains of grain sizes of not more than 20 nm are considered to make a contribution to the realization of the soft magnetic characteristic. In order to facilitate production of the fine crystal grains of sizes not greater than 20 nm, it is advisable that the nitride layer and the non-nitride layer of the as-sputtered compositionally modulated nitride alloy film have thicknesses not greater than 20 nm, i.e., that the compositionally modulated wavelength of the compositionally modulated nitride alloy film be maintained to be not more than 20 nm. This is also supported by FIG. 5 showing the relationship between the coercive force (Hc) and the compositionally modulated wavelength (λ) of the soft magnetic alloy film after 1-hour high-temperature heat treatment at 500° C., wherein the coercive force exhibits an appreciable reduction in the range of $\lambda \leq 40$ nm.

As has been discussed, the soft magnetic alloy film in accordance with the present invention exhibits both a low level of coercive force and high saturation magnetization as a result of a change in the alloy film structure caused by the heat treatment at high temperature. The fact that superior soft magnetic characteristics are obtained through a high-temperature heat treatment is advantageous when this alloy is intended for use as a soft magnetic alloy film for magnetic head cores. It is also possible to improve characteristics such as magnetic permeability, when the high-temperature heat treatment of the as-sputtered compositionally modulated nitride alloy film is conducted in a magnetic field. In the first embodiment, the soft magnetic alloy film after 1-hour high-temperature heat treatment at 500° C. in the absence of any magnetic field exhibited an initial magnetic permeability of about 800 at 1 MHz. In contrast, when the heat treatment was conducted for 1 hour at 500° C. in a fixed magnetic field of 400 Oe, the initial magnetic permeability as measured in the direction of axis of difficult magnetization was about 3000 at 1 MHz, thus proving the improvement in the soft magnetic characteristics by the heat treatment conducted in a magnetic field. The effect produced by the heat treatment in magnetic field has been recognized as induction magnetic anisotropy as in the cases of amorphous alloys and permalloys. According to the invention, it has been confirmed that the heat treatment in a magnetic field is effective also in the case of a crystalline alloy film containing Fe as a main constituent.

Compositionally modulated nitride alloy films (CMNF) were prepared by using the above-mentioned alloy target while the nitrogen gas partial pressure Pn and the composition modification wavelength λ were varied, and these alloy films were heat-treated at high temperatures so that samples of the soft magnetic alloy films of the present invention were fabricated. Levels of coercive force, corrosion resistance and wear amount ratio of Sample Nos. 1 to 7 are shown in Table 1, together with those of comparison sample Nos. 8 to 10 having various different structures.

bending, on an assumption that the Young's modulus was 150 Mpa.

TABLE 1

|  | Sample Nos. | structure | Nitrogen gas partial pressure ratio Pn (%) | Compositionally modulated wavelength λ(nm) | Coercive force Hc (Oe) | Corrosion resistance | Wear resistance |
|---|---|---|---|---|---|---|---|
| Examples of Embodiment | 1 | Compositionally modulated nitride film | 5 | 10 | 0.6 |  | 0.6 |
|  | 2 |  | 5 | 20 | 0.6 |  | 0.7 |
|  | 3 |  | 10 | 10 | 0.5 |  | 0.5 |
|  | 4 |  | 10 | 20 | 0.6 |  | 0.5 |
|  | 5 |  | 10 | 40 | 2 |  | 0.6 |
|  | 6 |  | 15 | 10 | 0.6 |  | 0.6 |
|  | 7 |  | 15 | 20 | 0.7 |  | 0.5 |
| Comparison Example | 8 | Compositionally modulated nitride film | 10 | 100 | 6 | Δ | 0.7 |
|  | 9 | Single-layered nitride film | 10 | — | >20 |  | 0.5 |
|  | 10 | Single-layered non-nitride film | — | — | 0.6 | X | 1 |

TABLE 2

|  | Sample Nos. | Sample structure | Nitrogen gas partial pressure ratio Pn (%) | Compositionally modulated wavelength λ(nm) | Saturation magnetization 4π Ms (k G) | Saturation magnetostriction constant λs ($\times 10^{-6}$) |
|---|---|---|---|---|---|---|
| Examples of Embodiment | 11 | Compositionally modulated film | 10 | 10 | 12.6 | +4 |
|  | 12 |  | 10 | 20 | 12.4 | +5 |
|  | 13 |  | 10 | 40 | 12 | +7 |
| Comparison Example | 14 | Single-layered nitride film | 10 | — | 9.1 | — |
|  | 15 | Single-layered non-nitride film | — | — | 7.6 | +12 |

In Table 1 the term "corrosion resistance" is used to mean the results of microscopic observation of degree of rust on the samples after 24-hour immersion of the samples in pure water. Marks ○, Δ and X are used to mean, respectively, the state in which no rust was observed (excellent corrosion resistance), the state in which slight rust was observed and the state in which considerably heavy rust was observed (inferior corrosion resistance). The wear amount ratio is expressed in terms of the relative values of worn volume of the alloy films after a test running of a metal tape in a VCR tape running system. The greater value of the wear amount ratio indicates greater tendency of wear.

As will be seen from Table 1, Sample Nos. 1 to 7 which are the soft magnetic alloy film of the present invention exhibit superior soft magnetic characteristics represented by low levels of coercive force, as well as excellent corrosion- and wear-resistance. From the comparison between the samples of the alloy films of the invention and the Comparison Sample No. 8, it is understood that the compositionally modulated wavelength is preferably not greater than 50 nm, in order to obtain a compositionally modulated film which is superior in all aspects.

Table 2 shows the levels of the saturation magnetization 4 πMs and the saturation magnetostriction constant λs of Sample Nos. 11 to 13 of the soft magnetic alloy film of the invention, in comparison with those of Comparison Example Nos. 14 and 15. The alloy films of Sample Nos. 11 to 13 of the invention were heat-treated at temperatures of 400° to 500° C. The saturation magnetostriction constant was determined from a change in the anisotropic magnetic field which change occurs b As will be seen from Table 2, Sample Nos. 11 to 13 prepared in accordance with the invention exhibit very high levels of saturation magnetization as compared with Comparison Example 15 which is a single non-nitride alloy film. Thus, the Sample Nos. 11 to 13 are considered to exhibit superior recording characteristics when applied to, for example, magnetic head cores. Sample Nos. 11 to 13 also exhibit lower level of magnetostriction than Comparison Example 15 which is a single non-nitride alloy film. Practical Fe-based amorphous alloys generally exhibit greater saturation magnetostriction constant as the saturation magnetization level becomes higher. Sample Nos. 11 to 13 exhibit higher saturation magnetization level and smaller magnetostriction constant values as compared with Fe-based amorphous alloy.

As have been described, soft magnetic alloy films of the first embodiment exhibits superior soft magnetic characteristics, high level of saturation magnetization and low magnetostriction, as well as excellent thermal stability which ensures that the soft magnetic characteristics are never impaired even by heat treatment at a high temperature. In addition, corrosion resistance and wear-resistances also are excellent.

Second Embodiment

A second embodiment will be described below.

Sputtering was conducted on a ceramic substrate by using an alloy target having a composition expressed by $Fe_{79.5}Nb_{8.5}Si_{12}$ (atomic %), while periodically mixing nitrogen gas into the Ar gas which was used as the inert sputtering gas, whereby a compositionally modulated nitride alloy film was formed on the ceramic substrate such that nitride layer of 10 nm thick per layer and non-nitride layer of 10 nm thick per layer were alternately deposited. In some cases, the sputtering was conducted with the nitrogen gas partial pressure ratio Pn of 5%, while, in other cases, the nitrogen gas partial pressure ratio Pn was increased to 10%.

The as-sputtered compositionally modulated nitride alloy film before the high-temperature heat treatment, as obtained by sputtering at Pn=10%, exhibited a saturation magnetization level of 9 kGauss and a coercive force of 7.6 Oe, whereas, in the cases of the as-sputtered compositionally modulated nitride alloy film obtained at Pn=5%, the levels of the saturation magnetization and the coercive force were 9.6 kGauss and 7.5 Oe, respectively. These values are unsatisfactory when these materials are intended for use as magnetic head core materials. The as-sputtered compositionally modulated nitride alloy films were then subjected to 1-hour heat treatment at 500° C. conducted in a fixed magnetic field of 400 Oe, so that soft magnetic alloy films were obtained. The soft magnetic alloy film obtained at Pn=5% exhibited a saturation magnetization level of 12 kGauss and a coercive force of 0.4 Oe, whereas, in the cases of the soft magnetic alloy film obtained at Pn=10%, the levels of the saturation magnetization and the coercive force were 11.7 kGauss and 0.6 Oe, respectively. Thus, these soft magnetic alloy films showed high levels of saturation magnetization, as well as excellent soft magnetic characteristics. When the high-temperature heat treatment was conducted in a magnetic field, the soft magnetic alloy film exhibited a good initial magnetic permeability of about 1000 or higher at 1 MHz as measured in the direction of axis of difficult magnetization.

Figure 6A:
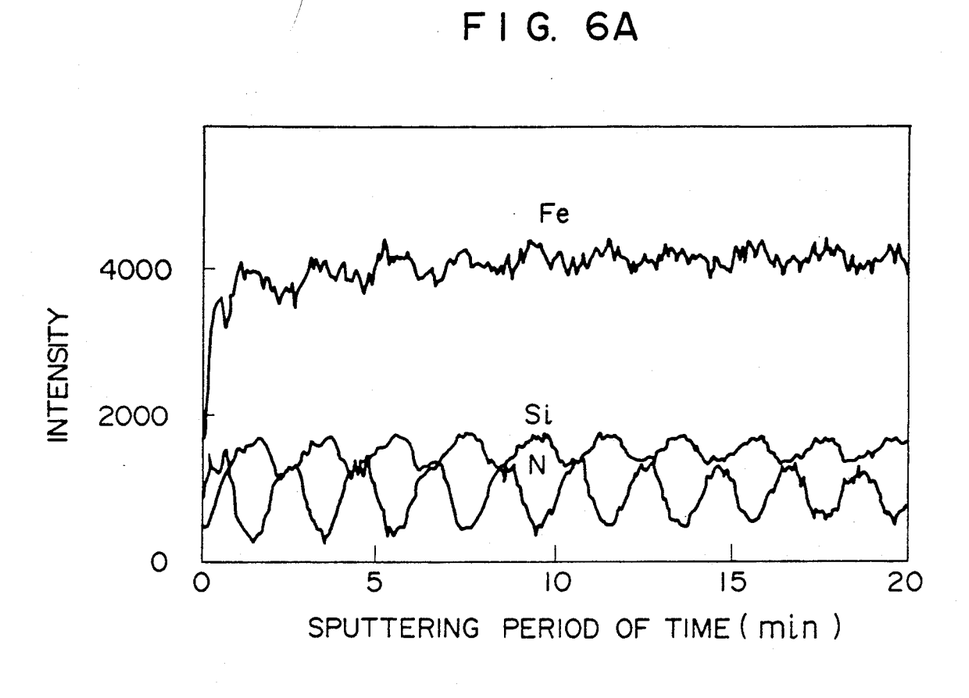
Figure 6B:
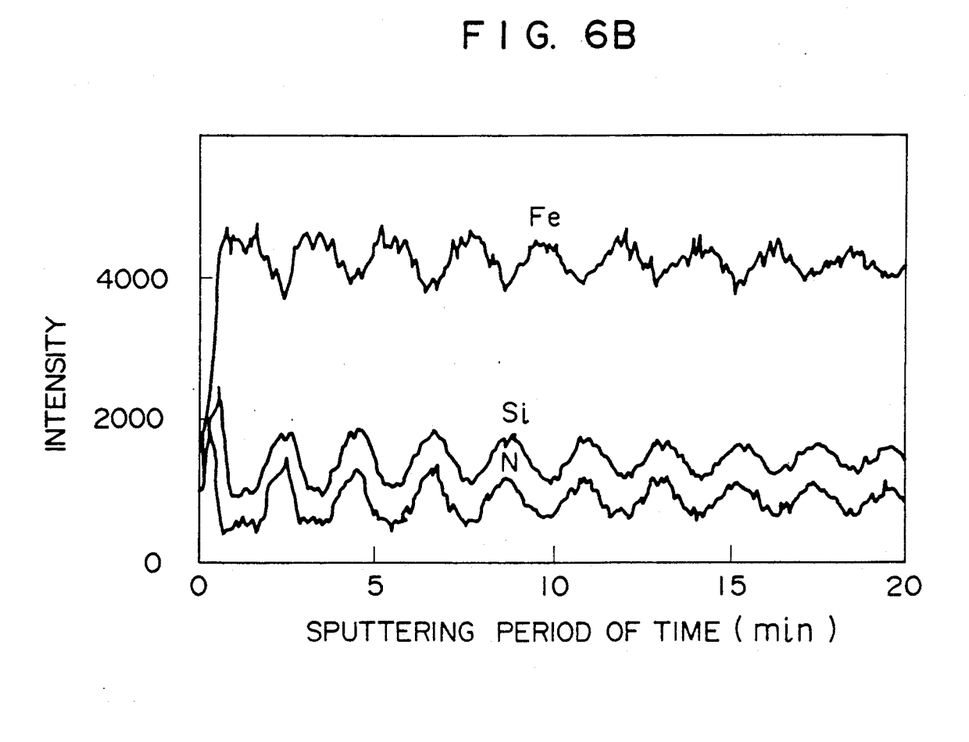

FIGS. 6(a) and 6(b) show AES depth profiles concerning Fe, N and Si in the direction of the film thickness as obtained through Auger Electron Spectroscopy. More specifically, FIG. 6(a) shows the compositionally modulated nitride alloy film in the state before high-temperature heat treatment, while FIG. 6(b) shows the state of the soft magnetic alloy film as obtained through 1-hour heat treatment at 500° C. As will be seen from FIG. 6(a), the as-sputtered compositionally modulated nitride alloy film has a nitride layer rich in N and a non-nitride layer rich in Si. In contrast, in the soft magnetic alloy film obtained through the high-temperature heat treatment, the Si content is greater in the nitride layer than in the non-nitride layer, while the Fe content is greater in the non-nitride layer than in the nitride layer, as will be seen from FIG. 6(b). This is attributable to a special manner of diffusion caused by the fact that the metalloid elements such as Si exhibits a greater tendency of bonding to nitrogen than to Fe. In this embodiment, the compositional modulation caused by the high-temperature heat treatment is unclear with respect to Nb which is a metallic element. It has been confirmed, however, a film structure composed of a nitride layer rich in nitrogen and metalloid elements and a non-nitride layer poor in nitrogen and metalloid elements and, hence, superior soft magnetic characteristics are obtainable through a high-temperature heat treatment, even when an Fe-Nb-Si ternary alloy is used as the target for the spattering. It is considered that a substantially equivalent effect will be obtained if Si is replaced by C which exhibits properties similar to those of Si.

Third Embodiment

A description will be given of a third embodiment of the present invention which is a soft magnetic alloy film having excellent soft magnetic characteristics and high resistances to corrosion and wear, as well as specifically high level of saturation magnetization and low level of magnetostriction.

Figure 7:
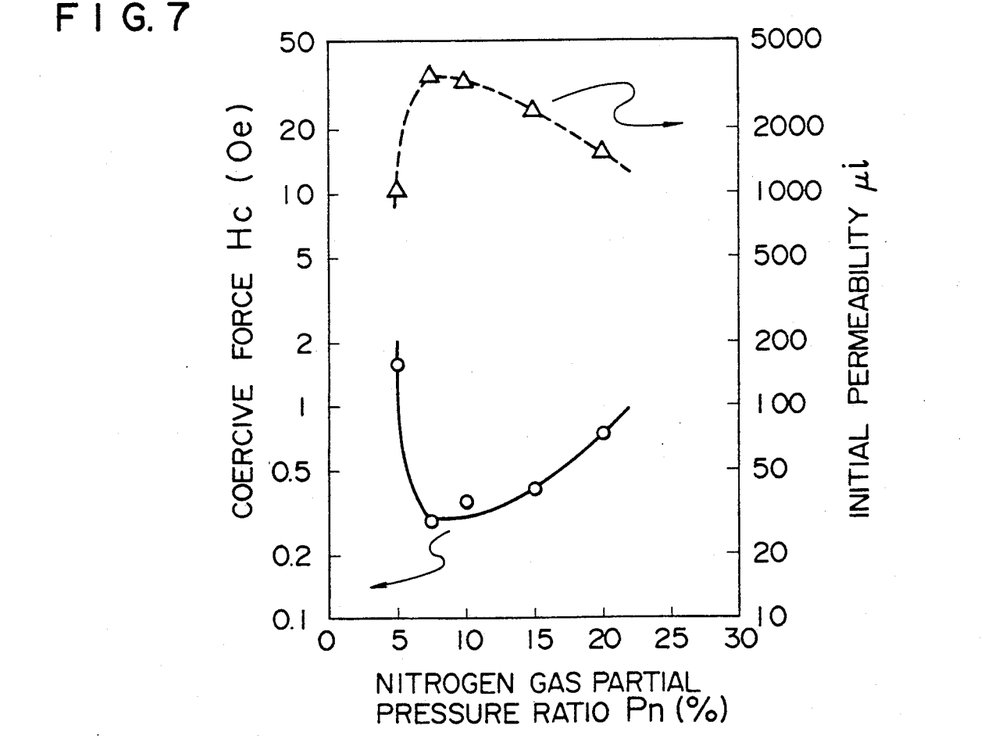
Figure 8:
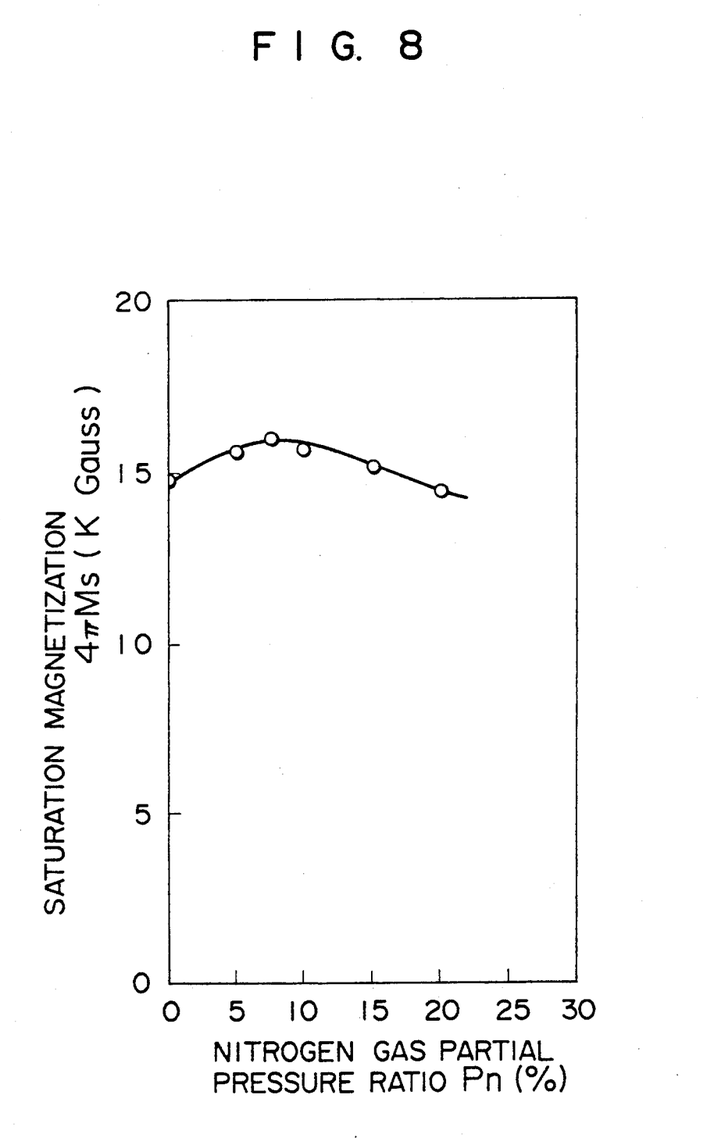
Figure 9:
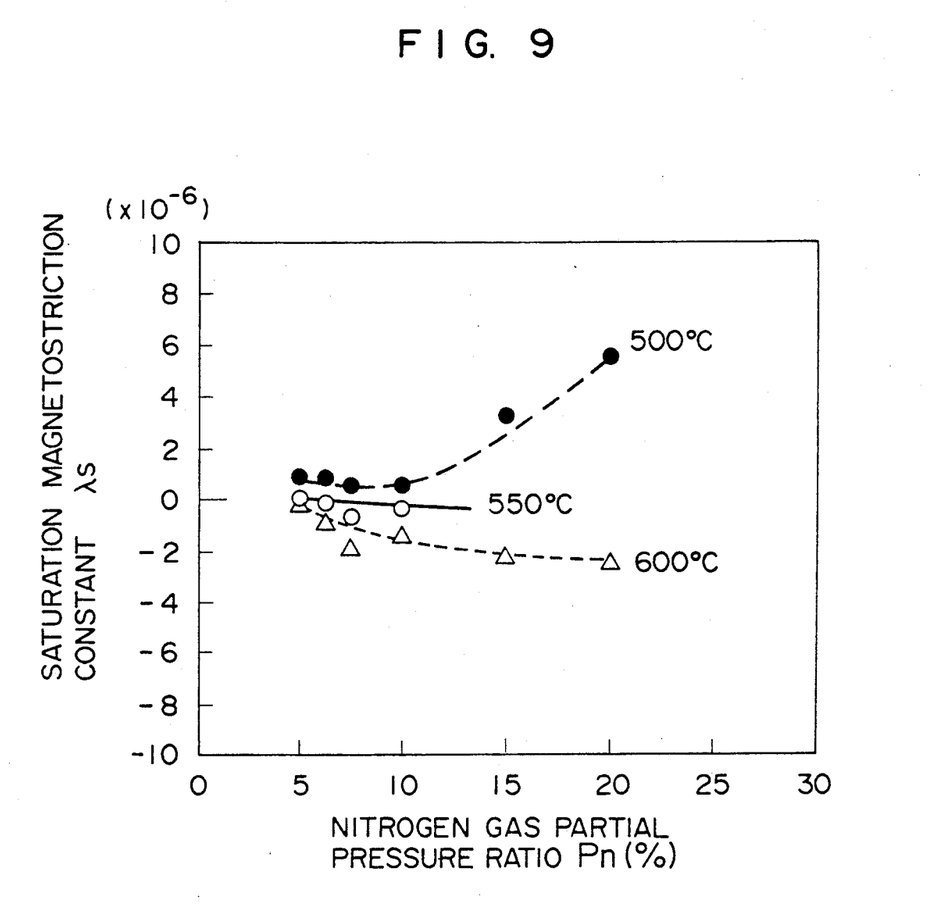

A sputtering was conducted by using an alloy target having a composition expressed by $Fe_{85}Nb_5Si_2B_8$ (atomic %) while periodically mixing nitrogen gas with the sputtering argon gas at a nitrogen gas partial pressure ratio Pn of 0 to 20%, whereby a compositionally modulated nitride alloy film was formed to have a multi-layered structure composed of nitride layers of 10 nm thick per layer and non-nitride layers of 10 nm thick per layer which were periodically laminated in the direction of thickness of the film. The conditions of sputtering was varied so that different compositionally modulated nitride alloy film was obtained to have thicknesses of 1 to 3 μm. The thus-obtained as sputtered compositionally modulated nitride alloy films were subjected to heat treatment in a fixed magnetic field. FIG. 7 shows the relationship between the nitrogen gas partial pressure ratio Pn and the coercive force Hc and the initial magnetic permeability $\mu_i$ of the alloy film obtained through 1-hour heat treatment conducted at 500° C. Similarly, FIG. 8 shows the relationship between the nitrogen gas partial pressure ratio Pn and the saturation magnetization $4\pi Ms$ of the alloy film obtained through 1-hour heat treatment conducted at 500° C. From FIGS. 7 and 8, it will be understood that excellent soft magnetic characteristics and extremely high level of saturation magnetization are obtainable after the high temperature heat treatment when the preceding sputtering is conducted at nitrogen partial pressure ratio Pn ranging between 5 and 15%. It is to be noted that the soft magnetic alloy films formed under the conditions of Pn=5 to 15% has superior initial magnetic permeability of 1000 to 3000. FIG. 9 shows the relationship between the nitrogen partial pressure ratio Pn and the saturation magnetostriction λs exhibited by the soft magnetic alloy films as obtained through 1-hour heat treatment at 500° C., 550° C. and 600° C. The saturation magnetostriction constant as shown in FIG. 9 has been simply determined from a change in the anisotropic magnetic field after application of a bending stress, on an assumption that the Young's modulus is 150 Mpa. In this type of soft magnetic alloy film, the value of the magneto-striction constant varies according to the heat treating temperature. It is to be noted, however, that the magnetostriction constant is remarkably reduced, more particularly substantially to zero or near zero, after a heat treatment conducted at 500 to 600° C when the sputtering was conducted at the nitrogen partial pressure ratio Pn of 5 to 15%.

Generally, an alloy film composition formed by sputtering tends to deviate from the composition of the alloy target. In the case of the alloy film mentioned above, when the partial pressure ratio Pn is 0%, the single-layered non-nitride alloy film has a composition expressed by $Fe_{86.5}Nb_{4.5}Si_2B_7$. THus, the Fe content of the alloy film is greater than that in the alloy target. In the soft magnetic alloy film of the present invention, the composition ratios of the elements such as Fe, Nb and B are reduced because of inclusion of nitrogen. For instance, the soft magnetic alloy film of the described embodiment, which is formed under the condition of Pn=7.5% and which shows a specifically superior magnetic characteristics, exhibit a composition which expressed substantially by $Fe_{76}Nb_4Si_2B_6N_{12}$. According to the invention, it is possible to obtain, by forming a compositionally modulated nitride film at a nitrogen partial pressure ratio Pn ranging between 5 and 15 and then effecting a high-temperature heat treatment at 500° C. or higher, a soft magnetic alloy film exhibiting superior soft magnetic characteristics and high resistances to corrosion and wear, as well as specifically high level of saturation magnetization and low magnetostriction. Thus, a soft magnetic alloy film of the invention which simultaneously have both extremely high saturation magnetization and extremely low magnetostriction can be formed by conducting the sputtering with an alloy target which is rich in Fe and comparatively poor in metal and metalloid elements as represented by formulae (4) and (4′) at a nitrogen partial pressure ratio as indicated by the formula (4″).

As has been described, the third embodiment of the soft magnetic alloy in accordance with the present invention, which is comparatively rich in Fe, exhibits an extremely high level of saturation magnetization of 15 kGauss or higher, superior soft magnetic characteristics and extremely low magnetostriction Fourth Embodiment As a fourth embodiment, soft magnetic alloy films having compositions as shown in Table 3 were formed by the method of the present invention. These soft magnetic alloy films had a compositionally modulated wavelength λ of 20 nm. In the preparation of these soft magnetic alloy films, the nitrogen gas partial pressure ratio Pn was selected to range between 5 and 15%, and the high-temperature heat treatment was conducted at a heat-treating temperature of 400° to 650° C. in a magnetic field of 400 Oe. All the compositionally modulated nitride alloy films of the fourth embodiment showed excellent corrosion- and wear-resistances. The magnetic characteristics of these alloy films of the fourth embodiment are shown in Table 3.

main component and essentially includes N, at least one metal elements selected from the group consisting of Nb, Ta, Zr and Ti and at least one metalloid element selected from the group consisting of B and Si. As in the cases of Sample Nos. 25 to 27, Fe may be partially replaced by Co or Ni, provided that Fe remains to be the main constituent. It is also possible to replace Si as the metalloid element by Co which exhibits properties similar to those of Si and which has greater affinity to nitrogen than to Fe.

As will be understood from the description of the fourth embodiment, the soft magnetic alloy film of the present invention can exhibit excellent soft magnetic characteristics and high levels of saturation magnetization over a wide variety of the alloy composition. The soft magnetic alloy films of the fourth embodiment did not show any generation of rust even after 24-hours immersion in pure water and small wear volume as measured as measured through a test conducted on an actual VCR tape running means using a metal tape, thus proving superiority both in corrosion resistance and wear resistance. It was also confirmed that the soft magnetic alloys in accordance with the fourth embodiment, after a high-temperature heat treatment, exhibited film structures composed of a nitride layer rich in both nitrogen and metalloid elements and a non-nitride layer poor in nitrogen and metalloid elements and containing fine crystal grains of Fe based alloy.

As has been described, the soft magnetic alloy films in accordance with the fourth embodiments of the present invention exhibit superior soft magnetic characteristics, high levels of saturation magnetization, low magnetostriction and high thermal stability which prevents the soft magnetic characteristics from being impaired by high-temperature heat treatment, as well as excellent corrosion resistance and wear resistance.

Fifth Embodiment

Table 4 shows magnetic characteristics of soft magnetic alloy films formed as fifth embodiment of the invention by the method of the present invention. The

TABLE 3

| | Sample Nos. | Mean Composition of film (atom %) | Saturation magnetization 4ηMs (kG) | Coercive force Hc (Hc) |
|---|---|---|---|---|
| Examples of Embodiment | 16 | $Fe_{72}Nb_7Si_2B_9N_{10}$ | 12.4 | 0.6 |
| | 17 | $Fe_{74}Nb_7Si_3B_{10}N_6$ | 12 | 0.7 |
| | 18 | $Fe_{73}Nb_6B_{14}N_8$ | 13.6 | 0.9 |
| | 19 | $Fe_{77}Nb_4B_6N_{13}$ | 15 | 0.7 |
| | 20 | $Fe_{72}Nb_5Ta_2Si_2B_9N_{10}$ | 12 | 0.7 |
| | 21 | $Fe_{72}Nba_7Si_2B_9N_{10}$ | 11.8 | 0.7 |
| | 22 | $Fe_{79}Ta_3B_7N_{11}$ | 16.3 | 0.3 |
| | 23 | $Fe_{76}Zr_4B_7N_{13}$ | 15 | 0.6 |
| | 24 | $Fe_{70}Ti_6B_{14}N_{10}$ | 12 | 0.8 |
| | 25 | $Fe_{69}Co_4Nb_6Si_2B_9N_{10}$ | 14 | 0.7 |
| | 26 | $Fe_{68}Ni_4Nb_7Si_2B_9N_{10}$ | 10.7 | 0.6 |
| | 27 | $Fe_{71}Co_1Ni_1Nb_7Si_2B_9N_9$ | 12 | 0.6 |
| | 28 | $Fe_{73}Nb_8Si_{11}N_8$ | 12 | 0.7 |

As will be seen from Table 3, all the samples Nos. 16 to 28 of the compositionally modulated nitride alloy films in accordance with the fourth embodiment exhibit high level of saturation magnetization and low level of coercive force, thus proving excellency as the soft magnetic alloy films. The mean compositions of the soft magnetic alloy films shown in Table 3 contain Fe as a formation of the compositionally modulated nitride alloy film was conducted such that a compositionally modulated wavelength λ is 20 nm, with the nitrogen gas partial pressure ratio Pn being selected to range between 5 and 20%. The high-temperature heat treatment was conducted at a temperature between 400° and 650° C. in a magnetic field of 400 Oe.

TABLE 4

| | Sample Nos. | Target Composition (atom %) | Saturation magnetization $4\pi Ms$ (kG) | Coercive force Hc (Oe) |
|---|---|---|---|---|
| Examples of Embodiment | 29 | $Fe_{76}Nb_9Si_3B_{12}$ | 12 | 0.4 |
| | 30 | $Fe_{76}Nb_{7.5}Si_{12}B_{5.5}$ | 11.5 | 0.7 |
| | 31 | $Fe_{85}Nb_5Si_2B_8$ | 15.5 | 0.3 |
| | 32 | $Fe_{88}Nb_4B_8$ | 15.8 | 0.9 |
| | 33 | $Fe_{88}Nb_2B_{10}$ | 16.2 | 1 |
| | 34 | $Fe_{88}Ta_4B_8$ | 16.3 | 0.3 |
| | 35 | $Fe_{84}Ta_8B_8$ | 14 | 0.3 |
| | 36 | $Fe_{87}Zr_5B_8$ | 15 | 0.6 |
| | 37 | $Fe_{78}Ti_7B_{15}$ | 12 | 0.8 |
| | 38 | $Fe_{70}Co_8Nb_6Si_4B_{12}$ | 15 | 0.7 |
| | 39 | $Fe_{80}Nb_8Si_{12}$ | 12 | 0.7 |

As will be seen from Table 4, all the sample Nos. 29 to 39 of the soft magnetic alloy films produced in accordance with the method of the invention exhibit high levels of saturation magnetization and low levels of coercive force. The sample No. 38 of the soft magnetic alloy film contains Co. Superior soft magnetic characteristics are obtainable even when a part of Fe is replaced by Co or Ni or the like provided that Fe remains the main constituent. All of the soft magnetic alloy films shown in Table 4 contain N, at least one metal element selected from the group consisting of Nb, Ta, Zr and Ti and at least one metalloid element selected from the group consisting of B and Si. Si as the metalloid element may be replaced by C which exhibits similar properties to those of Si and which has a greater affinity to nitrogen than to Fe.

As will be understood from the description of the fifth embodiment, the method of the present invention for producing a soft magnetic alloy film enables production of soft magnetic alloy films having both superior soft magnetic characteristics and high levels of saturation magnetization, over a wide range of composition. The soft magnetic alloy films of the fifth embodiment did not show any generation of rust even after 24-hours immersion in pure water and small wear volume as measured through a test conducted on actual VCR tape running using a metal tape, thus proving superiority both in corrosion resistance and wear resistance. It was also confirmed that the soft magnetic alloys in accordance with the fourth embodiment, after a high-temperature heat treatment, exhibited film structures composed of a nitride layer rich in nitrogen and metalloid elements and a non-nitride layer poor in nitrogen and metalloid elements and containing fine crystal grains of Fe based alloy.

As has been described, the soft magnetic alloy films produced by the method of the present invention exhibit superior soft magnetic characteristics and high level of magnetic saturation over a wide range of composition.

What is claimed is:

1. A soft magnetic alloy film containing at least one metalloid element selected from the group consisting of B, Si and C, at least one metal element selected from the group consisting of Nb, Ta, Zr and Ti, and a main constituent of Fe, wherein said soft magnetic alloy film has a modulated nitrogen content, said soft magnetic alloy film having a structure in which at least the nitrogen content is modulated in the direction of thickness of the film so as to have a nitride layer rich in both nitrogen and said metalloid element and a non-nitride layer poor in both the nitrogen and metalloid element, said structure containing fine crystal grains of Fe based alloy.

2. A soft magnetic alloy film of modulated nitrogen composition in which at least the nitrogen composition is modulated in the direction of thickness of the film and which film has a mean film composition expressed by MaTbXcNd, wherein M represents an Fe-based metal selected from a group consisting of Fe, Fe-Co, Fe-Ni and Fe-Co-Ni, T represents at least one metal element selected from the group consisting of Nb, Ta, Zr and Ti, X represents at least one metalloid element selected from the group consisting of B, Si and C, and N represents nitrogen, and wherein the contents a, b, c and d of M, T, X and N in terms of atomic % are selected to satisfy the following conditions:

$$60 \leq a \leq 90, 1 \leq b \leq 15, 2 \leq c \leq 25, 1 \leq d \leq 25$$

and $$a+b+c+d=100.$$

3. A soft magnetic alloy film according to claim 2, wherein said soft magnetic alloy film has a wavelength of composition modulation of not more than 50 nm in the direction of thickness of said film.

4. A soft magnetic alloy film of modified nitrogen composition in which at least the nitrogen composition is modified in the direction of thickness of the film and which has a mean film composition expressed by Ma"Tb"Xc"Nd", wherein M represents an Fe-based metal selected from the group consisting of Fe, Fe-Co, Fe-Ni and Fe-Co-Ni, T represents at least one metal element selected from the group consisting of Nb, Ta, Zr and Ti, X represents at least one metalloid element selected from the group consisting of B, Si and C, and N represents nitrogen and wherein the contents a", b", c" and d" of M, T, X and N in terms of atomic % are selected to satisfy the following conditions:

$$65 \leq a" \leq 90, 1 \leq b" \leq 10, 2 \leq c" \leq 13, 5 \leq d" \leq 20$$

and $$a"+b"+c"+d"=100.$$

5. A soft magnetic alloy film according to claim 4, wherein the composition modification has a wavelength in the direction of thickness of said film of not more than 40 nm.

* * * * *